(12) United States Patent
Singh

(10) Patent No.: US 10,157,379 B2
(45) Date of Patent: Dec. 18, 2018

(54) SELF CHECKOUT WITH SECURITY CHECKS BASED ON CATEGORIZED ITEMS

(71) Applicant: Toshiba Global Commerce Solutions Holdings Corporation, Tokyo (JP)

(72) Inventor: Ankit Singh, Morrisville, NC (US)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 854 days.

(21) Appl. No.: 14/539,322

(22) Filed: Nov. 12, 2014

(65) Prior Publication Data
US 2016/0132854 A1 May 12, 2016

(51) Int. Cl.
*G06Q 20/20* (2012.01)
*G07G 1/00* (2006.01)
*G06Q 30/06* (2012.01)

(52) U.S. Cl.
CPC ....... *G06Q 20/208* (2013.01); *G06Q 30/0633* (2013.01); *G07G 1/0072* (2013.01)

(58) Field of Classification Search
None
See application file for complete search history.

(56) References Cited

U.S. PATENT DOCUMENTS

| | | | |
|---|---|---|---|
| 7,319,990 B1* | 1/2008 | Henty | G01G 19/4144 356/326 |
| 8,430,311 B2 | 4/2013 | Ostrowski et al. | |
| 8,498,903 B2 | 7/2013 | Edwards | |
| 2003/0024982 A1* | 2/2003 | Bellis, Jr. | A47F 9/047 235/383 |
| 2004/0094620 A1 | 5/2004 | Nguyen et al. | |
| 2007/0210154 A1* | 9/2007 | Suto | G01G 19/414 235/383 |
| 2008/0147511 A1 | 6/2008 | Edwards | |
| 2008/0296392 A1* | 12/2008 | Connell, II | G06Q 20/208 235/472.01 |
| 2009/0017764 A1 | 1/2009 | Bonner et al. | |
| 2011/0311164 A1 | 12/2011 | Badharudeen et al. | |
| 2012/0095853 A1* | 4/2012 | von Bose | G06Q 20/20 705/16 |
| 2012/0197741 A1 | 8/2012 | Carlegren et al. | |
| 2012/0205433 A1 | 8/2012 | Dudek et al. | |
| 2012/0277991 A1* | 11/2012 | Wagner | G06Q 30/00 701/410 |
| 2013/0085879 A1 | 4/2013 | Edwards | |

(Continued)

OTHER PUBLICATIONS

TSA, Jun. 2013, https://www.tsa.gov/blog/2013/06/04/tsa-travel-tips-tuesday-reducing-stress-when-flying-children.*

(Continued)

*Primary Examiner* — Allen C Chein
(74) *Attorney, Agent, or Firm* — Patterson + Sheridan, LLP

(57) ABSTRACT

Method and apparatus for performing security checks at a self-checkout kiosk in a retail store. The customers can create lists of items for purchase as they shop. When a customer is ready to pay, his list can be divided into sub-lists. Each sub-list can include items that require the same type of security check. The customer can then be provided with the sub-lists and an instruction for each sub-list that explains how the customer should arrange the items on the sub-list for a security check. After the customer has properly arranged the items on a sub-list, the relevant security check can be performed.

20 Claims, 9 Drawing Sheets

(56) References Cited

U.S. PATENT DOCUMENTS

2013/0320084 A1    12/2013  Amada et al.
2015/0046239 A1*  2/2015  Di Franco .............. G06Q 20/40
                                                               705/14.17

OTHER PUBLICATIONS

Ogg, Erica, Walmart inches toward mobile checkout with Scan & Go app for iPhone, Mar. 20, 2013, Gigaom, Inc., <https://gigaom.com/2013/03/20/walmart-inches-toward-mobile-checkout-with-scan-go-app-for-iphone/>.

Walmart Expanding 'San & Go' iPhone Self-Checkout to Over 200 Stores, MacRumors: news and rumors you care about, Mar. 20, 3013, MacRumors.com, LLC, <http://forums.macrumors.com/showthread.php?t=1559545>.

Limer, Eric, Gizmodo, Mastercard's MasterPass Turns Your Phone Into Your Own Personal Checkout Lane, Feb. 25, 2013, <http://gizmodo.com/5986724/mastercards-masterpass-turns-your-phone-into-your-own-personal-checkout-lane>.

Osborne, Martyn H., Consumer applications: Another IT headache or an opportunity?, PCMS, Nov. 19, 2013, p. 1, <http://www.pcmsdatafit.com/blog/2013/11/>.

\* cited by examiner

```
┌─────────────────────────────────────────────────────┐ ─ 500
│ PLEASE PLACE THE FOLLOWING ITEMS                    │
│ ON THE SCALE TOGETHER:                              │
│     • BOX OF CHEERIOS CEREAL                        │
│     • CAN OF DEL MONTE GREEN BEANS                  │
│     • BOX OF CHOCOLATE FROSTED SUGAR BOMBS CEREAL   │
│     • BOX OF BARILLA PENNE PASTA                    │
│     • BOX OF RITZ CRACKERS                          │
│     • CAN OF CAMPBELL'S TOMATO SOUP                 │
└─────────────────────────────────────────────────────┘
```

FIG. 5A

```
┌─────────────────────────────────────────────────────┐ ─ 500
│ PLEASE PLACE THE FOLLOWING ITEMS                    │
│ ON THE SCALE FOR WEIGHING:                          │
│     • BANANAS                                       │
│     • APPLES                                        │
│     • SLICED HAM                                    │
│     • GROUND BEEF                                   │
└─────────────────────────────────────────────────────┘
```

FIG. 5B

```
┌─────────────────────────────────────────────────────┐ ─ 500
│ PLEASE PLACE THE FOLLOWING ITEMS                    │
│ ON THE SCALE ONE AT A TIME:                         │
│     • AVOCADOS ⌒─ 502                               │
│     • EARS OF CORN                                  │
└─────────────────────────────────────────────────────┘
```

SELF CHECKOUT WITH SECURITY CHECKS BASED ON CATEGORIZED ITEMS

BACKGROUND

The present embodiments relate to security checks for retail point-of-sale transactions.

Retail stores, such as grocery stores, hardware stores, and the like are increasingly using self checkout kiosks that enable customers to pay for items without the presence of a cashier. Such self checkout kiosks can be advantageous because they can be less costly than paying salaries to cashiers and self checkout kiosks are always available, thereby providing a retail store with greater flexibility for varying levels of customer traffic. However, self checkout kiosks tend to operate slowly in part because customers must scan or otherwise enter each item for purchase one at a time.

Mobile payment devices that enable customers to scan items as they are selected from shelves are becoming more popular. Such mobile payment devices can provide a complete, electronic shopping list to a self checkout kiosk or other point-of-sale machine when the customer is ready to check out, thereby increasing the speed of the purchase process.

SUMMARY

According to one embodiment, a method can include receiving a list of items being purchased by a consumer. For each item on the list, the method can include identifying a security check category associated with the item. The method can also include associating each item on the list with a sub list, wherein each sub list is associated with the different security check category. The method can also include providing a first one of the sub-lists and the first instruction for arranging the items on the first sub list for a first security check associated with the first security check category. The method can also include providing a second one of the sub-lists and a second instruction for arranging the items on the second sub list for a second security check associated with a second security check category.

BRIEF DESCRIPTION OF THE SEVERAL VIEWS OF THE DRAWINGS

FIG. 5A is a depiction of a computer display screen displaying an instruction for arranging certain items for a first security check;

FIG. 5B is a depiction of the computer display screen displaying an instruction for arranging certain items for a second security check;

FIG. 5C is a depiction of the computer display screen displaying an instruction for arranging certain items for a third security check;

DETAILED DESCRIPTION

Mobile payment devices, which customers can use in a retail store to log items for purchase as they are selected, can increase the speed of payment transactions at self-checkout kiosks because, in large part, the customer has already electronically tracked the items being purchased. However, the use of mobile payment devices may results in financial losses due to inadvertent mistakes or intentional fraud by a customer. For example, a particular brand of cereal may come in a 16 ounce box or a 24 ounce box. The customer may select the 16 ounce box size and scan it for purchase. However, the customer may then place the 24 ounce box in his shopping cart instead of the 16 ounce box. For example, after scanning the 16 ounce box, the customer may notice that the box is damaged. The customer may replace the 16 ounce box and unintentionally pick up the 24 ounce box. As another example, the customer may scan the 16 ounce box and instead take the 24 ounce box with fraudulent intent.

The methods, systems, and computer programs described below enable the customer to efficiently perform security checks on the items he intends to purchase so that a self checkout device can confirm that the customer is paying for the correct items.

Figure 1:
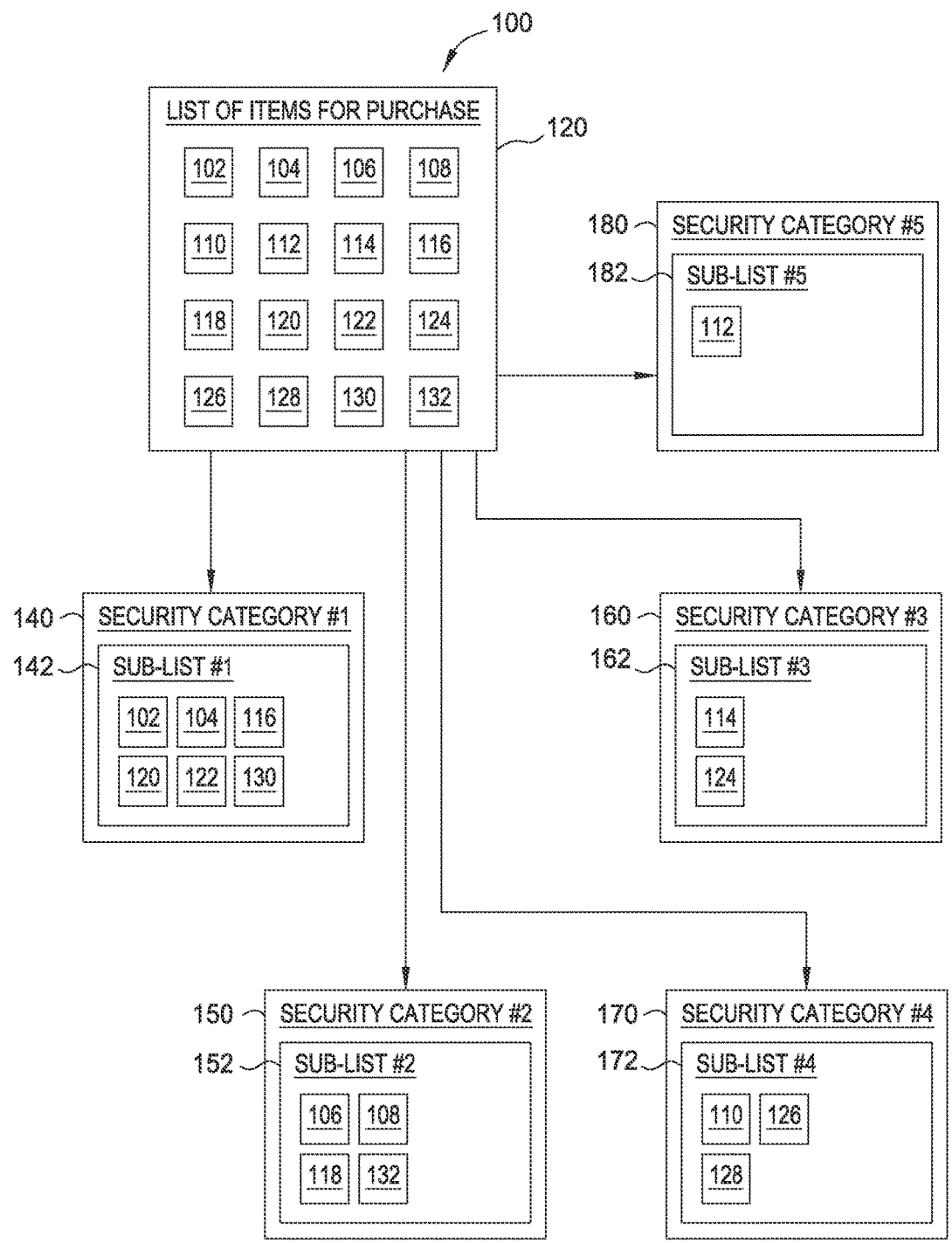
FIG. 1 is a block diagram illustrating an exemplary list of items for purchase, different security check categories, and sub-lists associated with each security check category.

FIG. 1 illustrates a block diagram of a scenario 100 in which a customer has selected items for purchase at a retail store. For example, the customer may be at a grocery store, a hardware store, etc. The customer in this scenario 100 used a mobile payment device (discussed in greater detail below) to identify items for purchase as they were selected. The mobile payment device prepared a list of items for purchase 120. The list of items for purchase 120 in this scenario 100 includes items 102-132. For example, if the retail store is a grocery store, then the items for purchase may include boxed goods (e.g., cereal and pasta), canned goods (e.g., soups and vegetables), paper products (e.g., paper towels and napkins), produce (e.g., fruits and vegetables), prepared foods, and other products. These products (and others) may require different types of security checks to ensure that the customer is purchasing the correct items. For example, boxed goods, canned goods, and paper goods, may be weighed to ensure that the customer is purchasing the correct sizes. As another example, certain produce (e.g., bananas and apples) and prepared foods may need to be weighed to ascertain a price for the items. As another example, certain produce (e.g., avocados) may need to be counted to ascertain a price. For other goods, computerized security checks may be ineffective or impractical, and such items may be passed around any security checks. For example, it may be impractical for customers to place large, heavy bags of dog food on a scale for security check verifications. As another example, it may be ineffective to place very light items (e.g., greeting cards) and/or fragile items (e.g., flower bouquets) on a scale for verification. As another example, for certain goods, security checks may be unnecessary. For example, lottery tickets and bags of ice are often purchased before a customer is provided access to the items. Similarly, gift cards usually require activation, and the cards are only activated by store personnel after they have been purchased.

Figure 4:
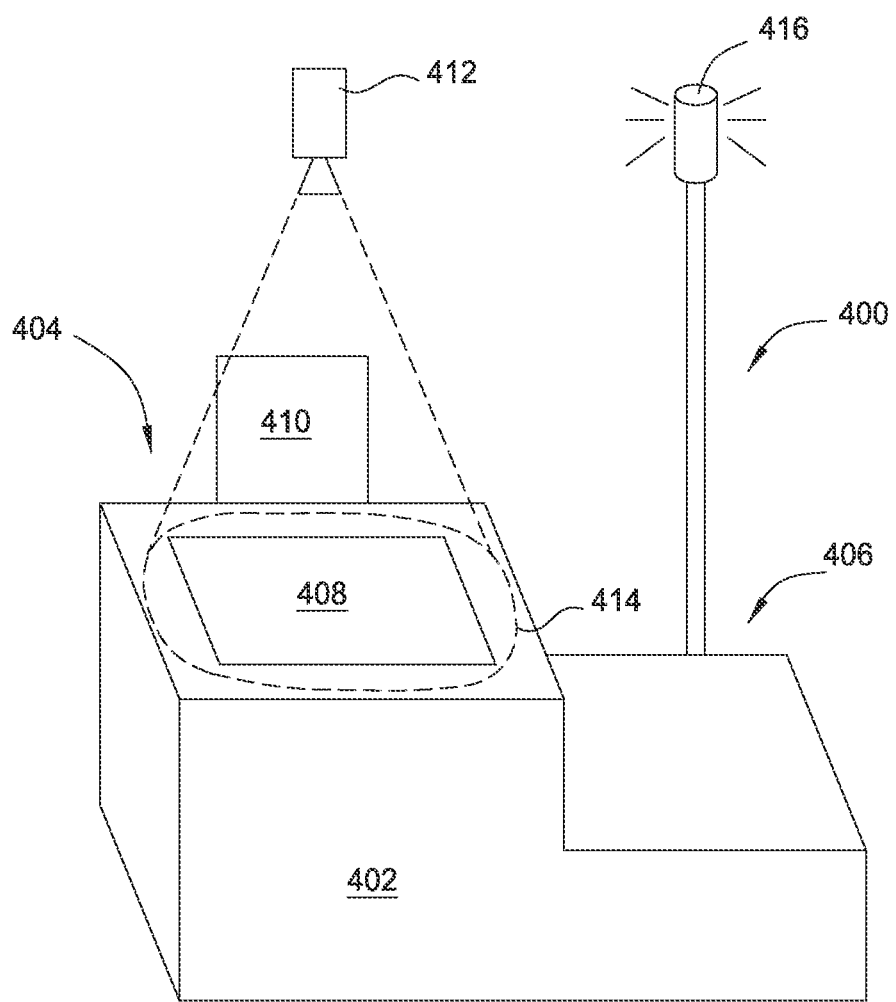
FIG. 4 is a perspective view of an embodiment of a self-checkout kiosk.

FIG. 4 illustrates an exemplary self-checkout kiosk 400. The self-checkout kiosk 400 includes a scan area 400 where a customer can arrange items for various security checks and a bagging area 406 where a customer can place items after the security checks have been completed. The scan area 404 includes a scale 408 that can weigh items. The self-checkout kiosk 400 also includes a camera 412 that has a field of view 414 on the scan area 404. The self-checkout kiosk includes a display screen 410 that can provide list of items for security checks and instructions for arranging the items for the security checks. The self-checkout kiosk also includes a light 416 that can be illuminated to draw the attention of store employees (e.g., in the event a security check fails). In the exemplary scenario 100 in FIG. 1, the items 102-132 in the list of items for purchase 120 fall into five different security check categories. For example, a first security check category 140 may require that the items be weighed to verify that the customer is purchasing the correct items. A sub-list 142 of the items 102-132 in the list 120 that fall into the first security check category 140 can be created. In the exemplary scenario 100, items 102 (e.g., a box of cereal), 104 (e.g., a can of vegetables), 116 (e.g., a box of pasta), 120 (e.g., a can of soup), 122 (e.g., another box of cereal), and 130 (e.g., a box of crackers) from the list 120 fall into the first security check category 140. Thus, items 102, 104, 116, 120, 122, and 130 form the first sub-list 142. As another example, a second security check category 150 may require that the items be weighed to ascertain a sale price. A sub-list 152 of the items 102-132 in the list 120 that fall into the second security check category 150 can be created. In the exemplary scenario 100, items 106 (e.g., bananas), 108 (e.g., ground beef), 118 (e.g., deli meat), and 132 (e.g., apples) from the list 120 fall into the second security check category 150. Thus, items 106, 108, 118, and 132 form the second sub-list 152. As another example, a third security check category 160 may require that certain items 102-132 in the list 120 be counted to ascertain a sale price. A sub-list 162 of the items that fall into the third security check category 160 can be created. In the exemplary scenario 100, items 114 (e.g., avocados) and 122 (e.g., ears of corn) from the list 120 fall into this third security check category 160. Thus, items 114 and 124 form of the third sub-list 162. As another example, a fourth security check category 170 may be items 102-132 in the list 120 for which computerized security checks may be impractical and/or ineffective. A sub-list 172 of the items that fall into the fourth security check category 170 can be created. In the exemplary scenario 100, items 110 (e.g., a large bag of dog food), 126 (e.g., a case of bottled water), and 128 (e.g., a greeting card) fall into the fourth security check category 170. Thus items 110, 126, and 128 form the fourth sub-list 172. As another example, a fifth security check category 180 may be items 102-132 in the list 120 for which security checks are unnecessary. A sub-list 182 of the items that fall into the fifth security check category 180 can be created. In the exemplary scenario 100, item 112 (e.g., a gift card that requires activation) falls into the fifth security check category 180. Thus item 112 forms the fifth sub-list 182.

FIG. 2 illustrates an embodiment of a method 200 for providing sub-lists of items for purchase to a customer, providing instructions to the customer for arranging or grouping items for respective security checks, and for performing the respective security checks. In block 202, a list of items (e.g., list 120 in FIG. 1) to be purchased is received. As described above, a customer may generate the list of items as he selects items in the store using a mobile payment device. For example, the mobile payment device may be a handheld dedicated machine provided by the store to the customer. The customer can scan a bar code on the item or otherwise enter items that he selects for purchase. As another example, the mobile payment device may be incorporated into a shopping cart or basket (e.g., an RFID scanner, barcode scanner, or the like), and may add items to the list as they are placed in the cart. As another example, the mobile payment device may be incorporated into the customer's smart phone (e.g., as an application running on the phone and the customer can capture images of the product or a bar code of the product using a camera of the smart phone). The generated list of items can be sent from the mobile payment device to a point-of-sale device or to a server associated with the point-of-sale device automatically when the customer approaches the point of sale machine. The generated list of items could also be sent from the mobile payment device upon the customer pressing a button or an icon on a touch screen to indicate that he is finished shopping. In block 204, each item on the list can be with a security check category. For example, as discussed above, dry goods, such as boxes of cereal or pasta, may be available in different sizes, resulting in different weights. As a result, such dry goods items could be associated with a security check category that requires the items to be weighed to ensure that the item on the list matches the item actually being purchased. In block 206, each item on the list can be associated with a sub-list, wherein each sub-list is associated with a different security check category. Continuing the example above, all of the dry goods in the customer's list that require weighing could be associated with a first sub-list and produce that must be weighed to determine a sale price could be associated with a second sub-list. In various embodiments, blocks 202, 204, 206 can be performed as the customer is shopping. For example, when the customer selects items using the mobile payment device, the item can be added to the list (block 202), a lookup operation can be performed to identify the security check category associated with the item (block 204), and the item can be associated with a sub-list (block 206). Alternatively, blocks 202, 204, and/or 206 can be performed after the customer is done shopping. For example, when the user approaches a point-of-sale device and/or indicates to the mobile payment device that he is done shopping, the scanned or otherwise entered items can be compiled into a list (block 202), a lookup operation can be performed on each item in the list to identify a security check category for each item (block 204), and each item can be associated with a sub-list (block 206).

The remaining blocks 208, 210, and 212 of the method 200 can be performed after the customer has finished shopping on a sub-list by sub-list basis. In block 208a of the method, a first of the sub-lists can be provided to the customer. For example, the mobile payment device may include a view screen that can display the items associated with the first sub-list. As another example, a point-of-sale device may include a view screen that can display the items associated with the first sub-list. In block 210a, the user is provided with a first instruction for arranging the items from the first sub-list for a first security check. FIG. 2B provides more detail of aspects of block 210a. In block 220, the first security check category is determined. In this example, the first security check category includes measuring a total weight of the items on the first sub-list. In block 222, an instruction can be provided to the user to place all items from the first sub-list on a scale together. Continuing the example above, the view screen on the mobile payment device or a view screen associated with a point-of-sale device may instruct the user to place all items from the first sub-list on a scale to be collectively weighed. In various instances, blocks 208a and 210a can be combined. For example, FIG. 5A depicts a computer view screen 500 displaying a list of items in the first sub-list and also an instruction to place the items on the scale for collective weighing. Alternatively, or in combination with the view screen, the customer can be provided with voice instructions for placing items from the first sub-list on the scale to be collectively weighed. In block 212a, a first security check associated with the first security check category can be performed after the items are arranged according to the first instruction. FIG. 2B provides more detail of aspects of block 212a. In block 224, after the customer has placed the items from the first sub-list on the scale 408 of the self-checkout kiosk 400, the self-checkout kiosk 400 can measure the total weight of the items. In block 226, the measured total weight can be compared to the expected total weight of the items. Continuing the example above, the first sub-list may include three dry goods that the customer is purchasing: an 18 ounce box of cereal, a 12 ounce box of crackers, and a 16 ounce box of pasta. These three items together should weigh 46 ounces. In block 228, a determination can be made whether the measured total weight is within a threshold amount of the expected total weight. If the three items together weigh 46 ounces, then the first security check is passed. In various embodiments, the method could incorporate a tolerance threshold amount for such a security check. For example, the tolerance threshold may be plus or minus one ounce. Using this exemplary tolerance threshold, in the example above, the three items together would need to weight between 45 ounces and 47 ounces to pass the first security check. If the difference is within the threshold amount, then in block 232, the first security check is passed. If the difference is not within the threshold amount, then the first security check is not passed, and, in block 230, an alert can be provided (e.g., illuminating the light 416 of the self-checkout kiosk 400).

As another example, the self-checkout kiosk 400 could send an electronic message to a computing device associated with an employee to alert the employee that his attention is needed. In various embodiments, the result of the security check (e.g., the security check performed in block 212a) may provide information that can be used to determine the transaction error. Continuing the example above, suppose that the three items together weigh 52 ounces, six ounces more than the expected weight. The weight difference could be used to help the customer and/or the employee to identify one or more likely erroneous items on the list. For example, the 18 ounce box of cereal may also come in a 24 ounce size—a 6 ounce weight difference. Thus, the cereal on the sub-list could be flagged as a likely erroneous item in the shopping cart to provide the customer and/or employee with a starting point to identify the cause of the security check error.

In the exemplary scenario described above in which the first sub-list includes three items, it may be possible for the customer to place the three items on the scale together. However, in other scenarios, the first sub-list may contain a greater number of items, and all of the items will not fit on the scale for a single weight measurement. In such instances, the first sub-list may be divided into several sub-lists, and the customer can be instructed to sequentially place each of the several sub-lists of items on the scale for measurement.

Figure 2A:
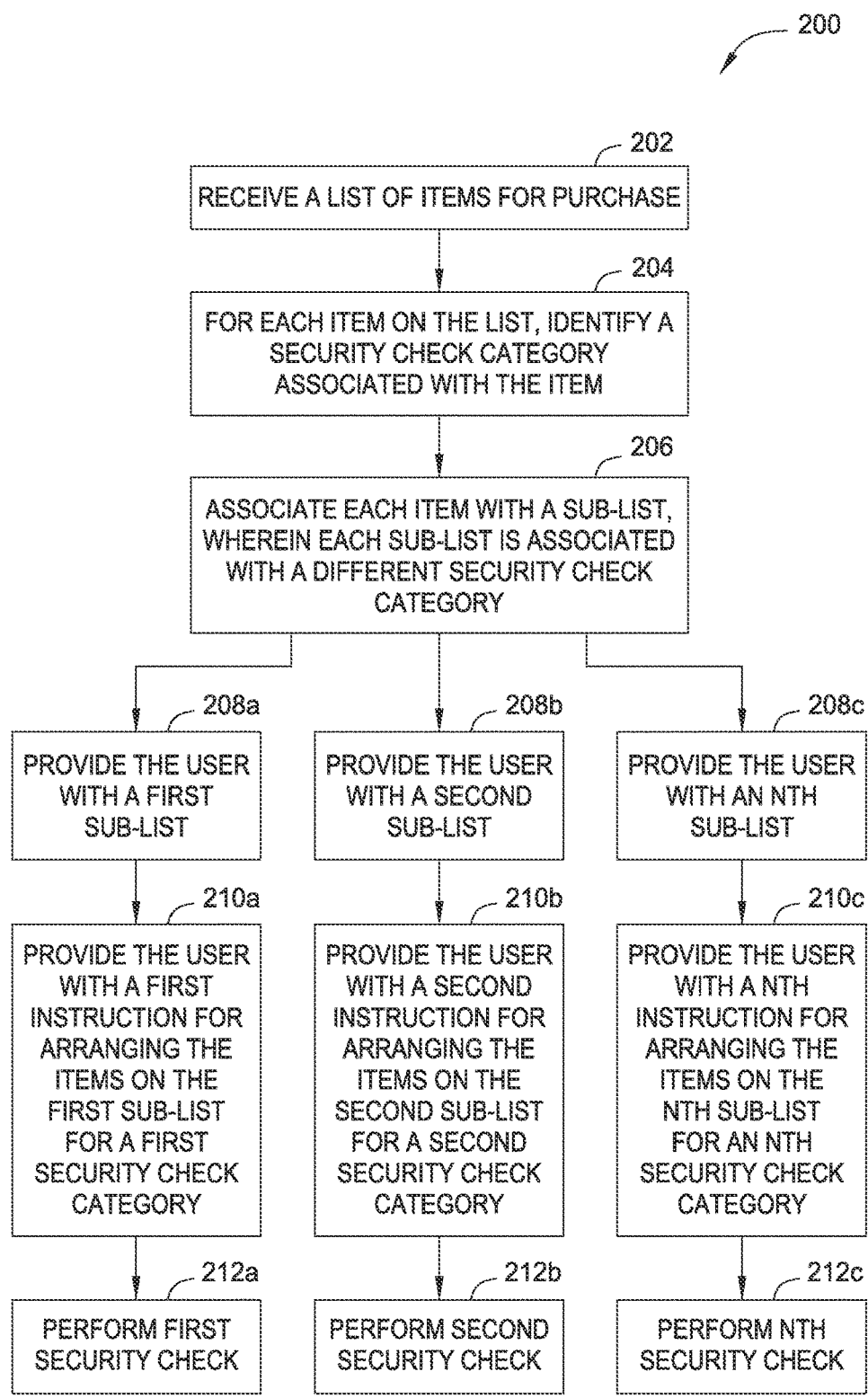
FIG. 2A is a block diagram illustrating an embodiment of a method for performing security checks on items in different sub-lists.
Figure 2B:
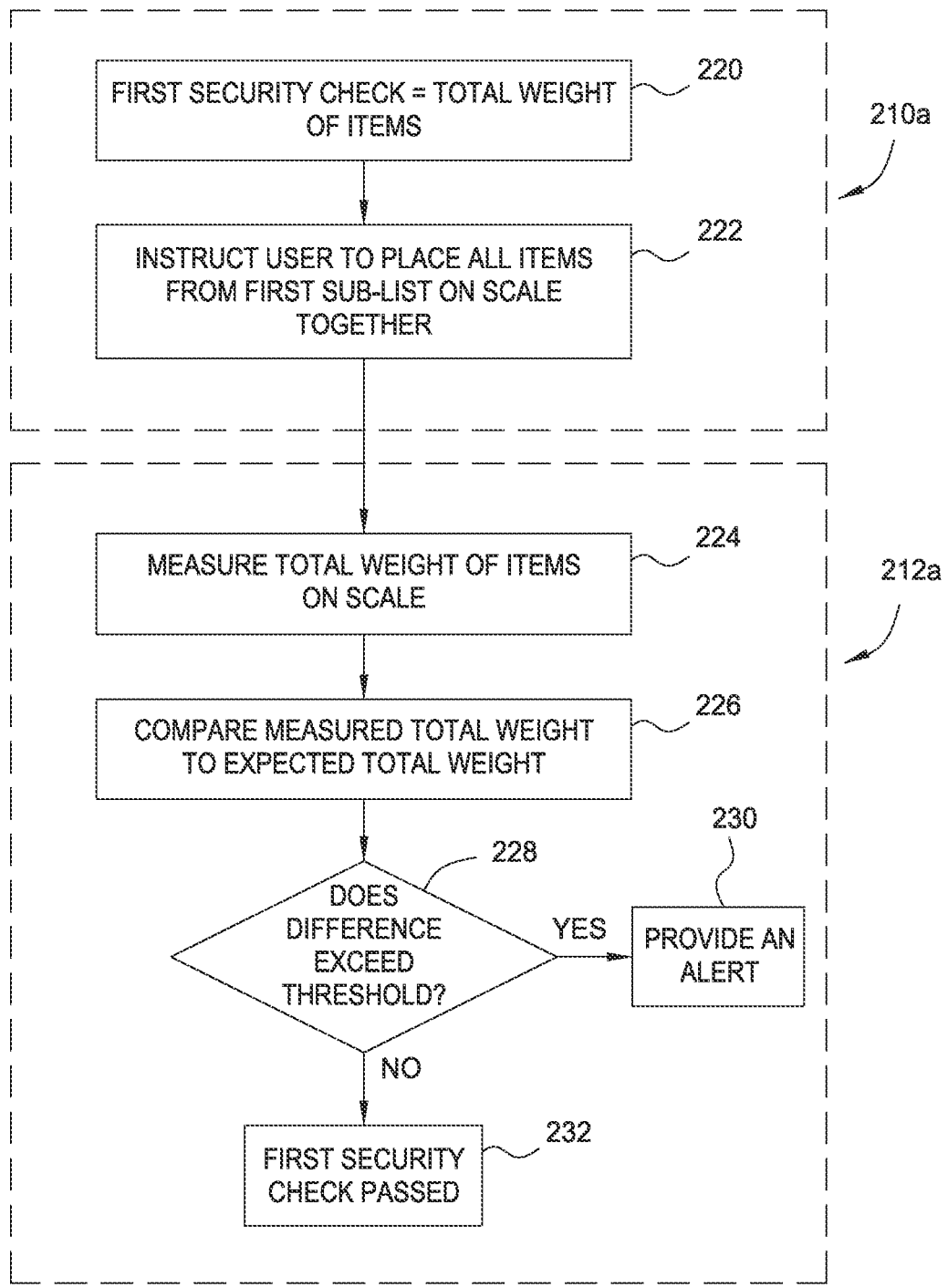
FIG. 2B is a block diagram illustrating detailed steps for instructing a user how to arrange items for a first security check from the method depicted in FIG. 2A.
Figure 2C:
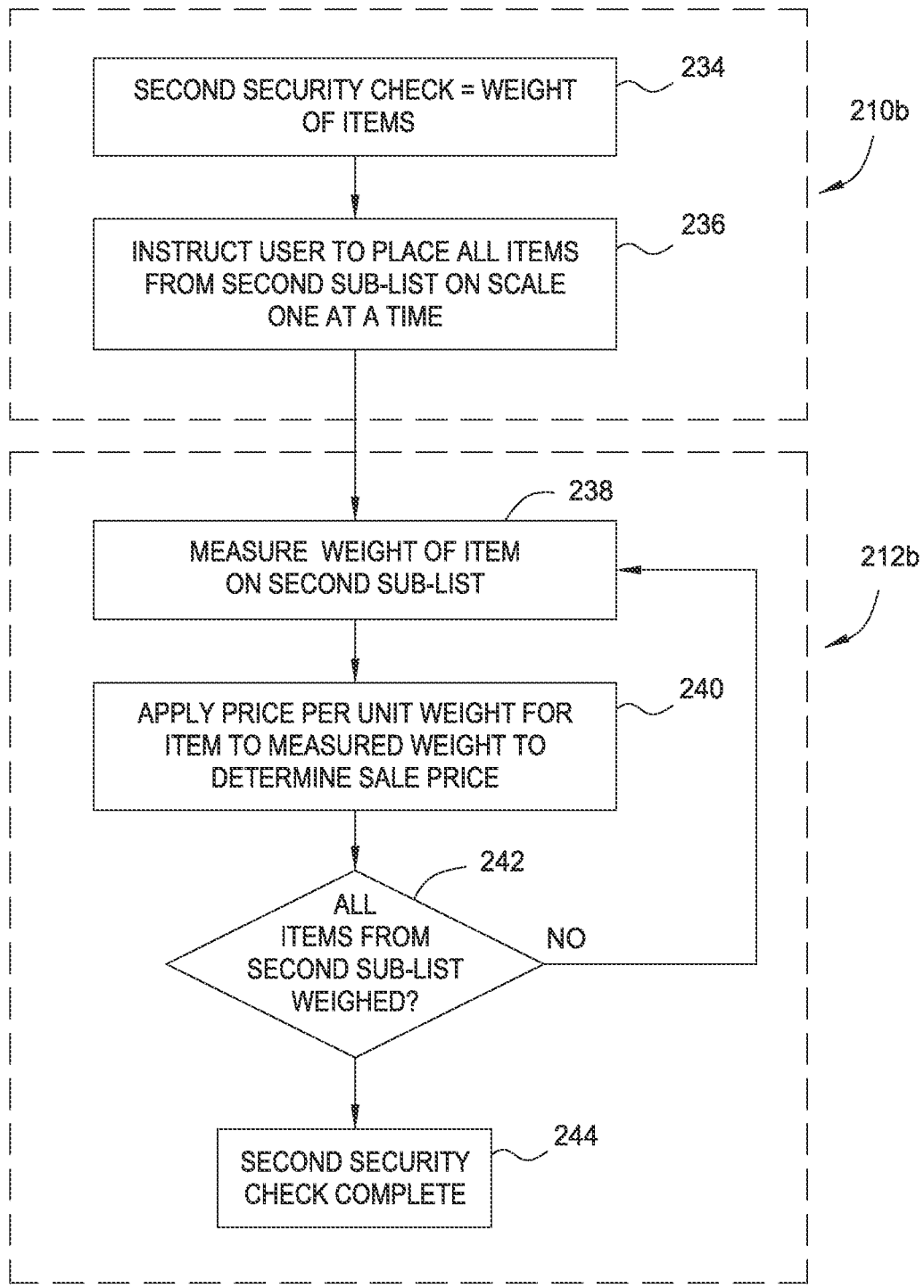
FIG. 2C is a block diagram illustrating detailed steps for instructing a user how to arrange items for a second security check from the method depicted in FIG. 2A.

Still referring to FIG. 2A, after the first security check has been performed at block 212a, the method 200 can provide the user with a second sub list of items (block 208b). For example, the second sub-list may include items, such as produce, that need to be weighed to determine a sale price. For example, the customer may have used the mobile payment device to indicate that he is purchasing apples and potatoes (e.g., which are priced on a per pound basis), but the apples and potatoes have not yet been weighed. In block 210b, the method 200 can provide the user with an instruction to first place the apples on the scale for weighing and then to place the potatoes on the scale for weighing. FIG. 2C provides more detail of aspects of block 210b. In block 234, a security check category is determined. In this example, the second security check category includes weighing items to determine a sale price. In block 236, an instruction can be provided to the user to place items from the second sub-list on a scale. In various instances, blocks 208b and 210b can be combined. For example, FIG. 5B depicts a computer view screen 500 displaying a list of items in the second sub-list and also an instruction to place the items on a scale for weighing. In various embodiments, the instructions can include an instruction to remove the apples from the scale before weighing the potatoes. In other embodiments, the instructions can include an instruction to add the potatoes to the scale with the apples. In such embodiments, the weight of the apples may be ascertained first. Then, the weight of the potatoes may be ascertained by subtracting the weight of the apples from the total weight of the apples and potatoes together. In block 212b, the method 200 can include performing a second security check on the items in the second sub-list. FIG. 2C provides more detail of aspects of block 212b. In block 238, the weight of an item placed on the scale (e.g., scale 408) can be measured. In block 240, a price per unit weight for an item can be applied to the measured weight to determine a sale price for the item. In block 242, a determination is made whether all items from the second sub-list have been weighed. If not, then the process returns to block 238. After all items from the second sub-list have been measured, the second security check is complete at block 244. In various embodiments, the second security check can also include visually verifying items being purchased (e.g., to ensure that what the customer has indicated to be bananas being weighed are not more-expensive apples). For example, the video camera 412 may capture images of the items that are being weighed. The video camera 412 could capture images of produce tags or stickers (e.g., that include four digit numbers associated with different types of produce) or the like to verify that the produce being weighed is correctly identified. Alternatively, the video camera(s) could capture images of the items themselves and compare the captured images to images in a database to identify the products. If the second security check is failed, an employee can be summoned to assist the customer in resolving the issues.

Still referring to FIG. 2A, after the second security check has been performed at block 212b, the method can provide the user with a third sub list of items (block 208c). For example, the third sub-list may include items, such as avocados, that need to be counted to determine a sale price.

Figure 2D:
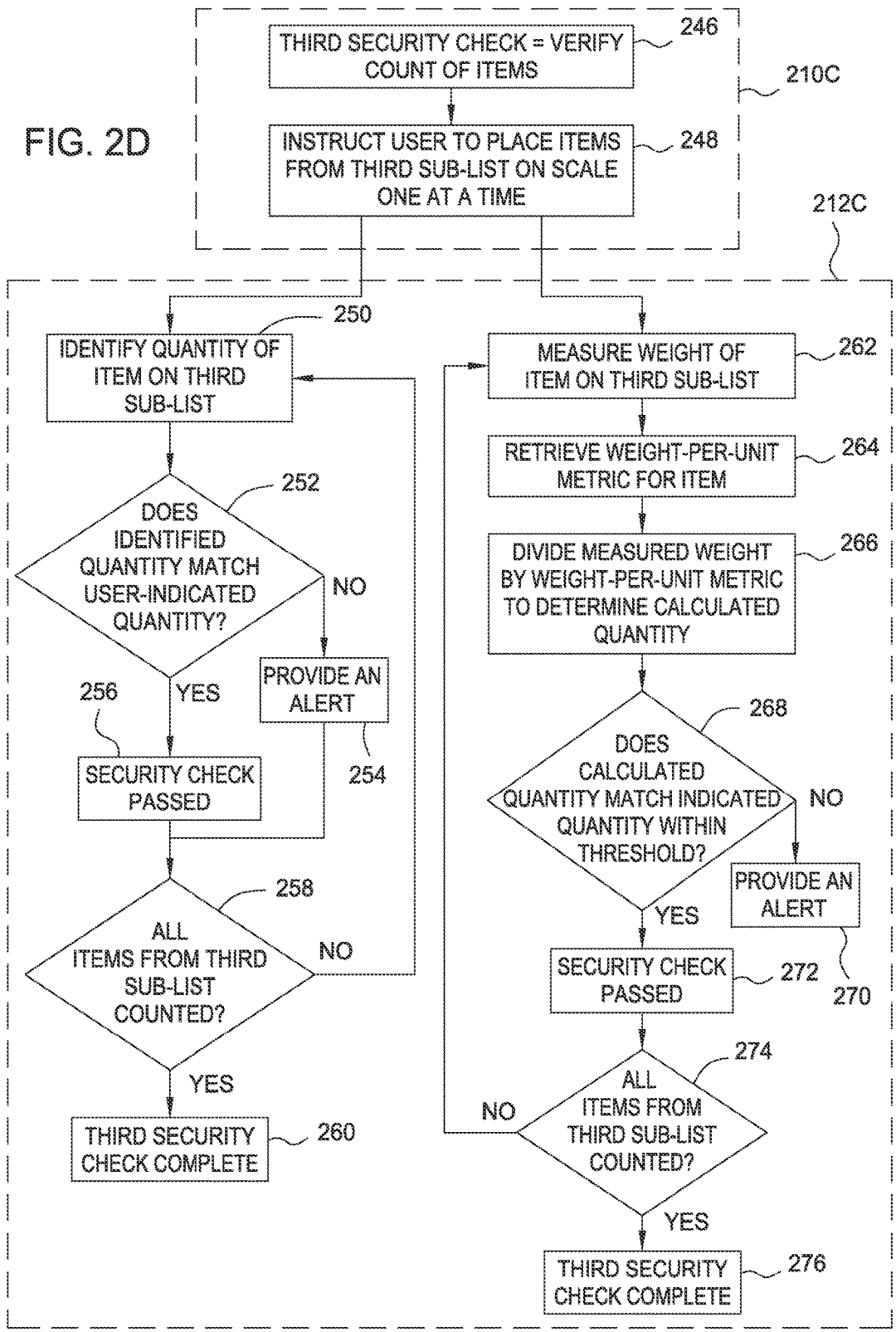
FIG. 2D is a block diagram illustrating detailed steps for instructing a user how to arrange items for a third security check from the method depicted in FIG. 2A.

For example, the customer may have used a mobile payment device to indicate that he is purchasing avocados (e.g., which are priced on a per avocado basis). In some versions of the mobile payment device, the customer may be able to indicate a purchase quantity. In other versions of the mobile payment device, the customer may not be able to indicate a purchase quantity. Regardless of the capabilities of the mobile payment device, at checkout, the quantity can be determined and/or verified. In block 210c, the method 200 can provide the customer with an instruction for arranging the items on the third sub-list for security verification. FIG. 2D provides more detail of aspects of block 210c. In block 246, a security check category is determined. In this example, the third security check includes counting items to determine a sale price. In block 248, an instruction can be provided to the customer to place items from the third sub-list in the scan area 404 for counting. In various instances, blocks 208c and 210c can be combined. For example, FIG. 5C depicts a computer view screen 500 displaying a list of items in the third sub-list and also an instruction to place the items on the scale for counting. The display screen may include an icon, such as a check mark 502 to indicate which item from the sub-list to place on the scale. As another example, the instruction may tell a customer to leave the avocados in his shopping cart, but to reenter the quantity on a keypad, touch screen, or the like on the point-of-sale device. In block 212c, the method 200 can perform the third security check. FIG. 2C provides more detail of aspects of block 212c. FIG. 2C illustrates two methods for verifying a quantity of any item. In a first method, in block 250, a quantity of an item can be identified. For example, if the customer is purchasing avocados, then the customer could place the avocados in the scan area 404 for counting and the camera 412 could capture an image of the avocados. Object recognition software or the like can analyze the image(s) captured by the video camera(s) to identify the number of objects in the region. In block 252, the identified quantity can be compared to a user-indicated quantity. If the identified quantity does not match the user-indicated quantity, then, in block 254, an alert is provided (e.g., illuminating the light 416 of the self-checkout kiosk 400. If the identified quantity matches the user-indicated quantity, then, in block 256, the security check for the avocados is passed. In block 258, a check is made to determine whether all items from the third sub-list have been checked. If not, then the process returns to block 250 to identify a quantity for the next item from the sub-list. If all items have been checked, then, in block 260, the third security check is complete. In a second method, in block 262, a weight of an item can be measured, and the measured weight can be used to determine whether the quantity identified by the user is likely correct. For example, if the customer is purchasing avocados, then the customer could place the avocados on the scale 408 in the scan area 404 for weighing. In block 264, a weight-per-unit metric for the item can be retrieved (e.g., from a database). For example, avocados for sale by the store may generally weigh between five and seven ounces each on average. In block 266, the measured weight can be divided by the weight-per-unit metric to determine a calculated quantity of avocados being purchased. For example, if the weight of the avocados on the scale is twenty one ounces, then the calculated quantity would be between three avocados (based on a seven ounce average weight) and 4.2 avocados (based on a five ounce average weight). In block 268, the calculated quantity can be compared to a customer-indicated quantity. If the customer-indicated quantity is within a threshold value of the calculated quantity, then, in block 272, the security check is passed. For example, based on the measured weight of twenty one ounces, the threshold quantity may be three or four. If the customer has indicated that he is purchasing three avocados or four avocados, then the security check is passed. If the customer-indicated quantity is outside of the threshold values, then an alert can be generated at block 270 (e.g., light 416 of the self-checkout kiosk can be illuminated). In block 274, if all items from the third sub-list have been checked, then the third security check is complete at block 276. If additional items remain to be checked, then the method returns to block 262 to check the next item. The above-described methods (in blocks 250-260 for the first method and blocks 262-276 for the second method) can be used separately or in combination. For example, the second method may be used in instances in which a self-checkout kiosk does not include a camera to capture an image of the items. As another example, the second method can be used in combination with the first method to provide a second level of security checking. The quantity identified by the camera in the first method can be compared to the calculated quantity from the second method. If the two quantities differ, then an alert can be generated.

As another exemplary method for performing the third security check, in instances where the customer entered a quantity of avocados using the mobile payment device, the instruction may tell the customer to leave the avocados in the shopping cart, but to reenter the quantity on a key pad, touch screen, or the like on the self checkout kiosk. If the later-entered quantity on the self-checkout kiosk differs from the earlier-entered quantity on the mobile payment device, then the third security check is failed. Again, if the third security check is failed, an alert can be generated.

Figure 5D:
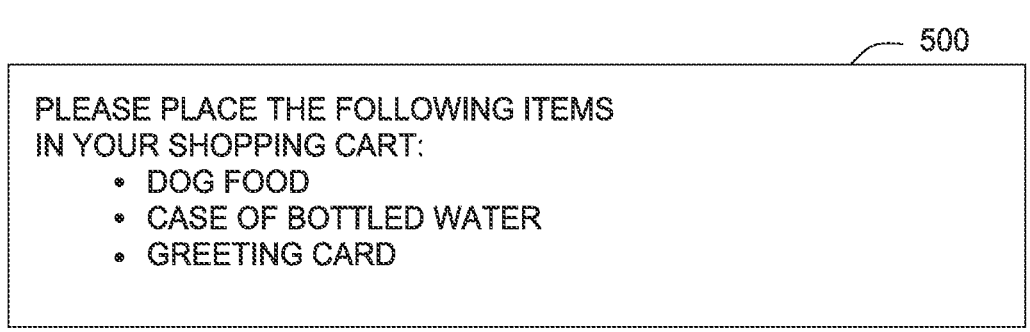
FIG. 5D is a depiction of the computer display screen displaying an instruction for leaving certain items in a shopping cart.
Figure 5E:
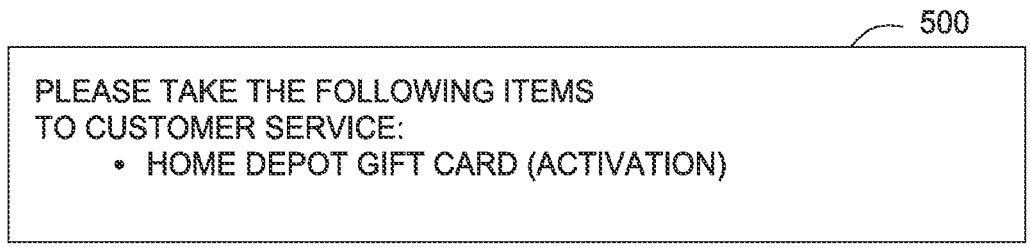
FIG. 5E is a depiction of the computer display screen displaying an instruction for taking certain items to a customer service counter.

As discussed above with FIG. 1, certain items do not require security checks. For example, lottery tickets are often not provided to the user until the user has paid for the tickets. Similarly, gift cards using magnetic strips often require activation, which does not occur until after the gift card has been paid for. Referring again to FIG. 2A, such items can be grouped into a sub-list (e.g., block 208c). The customer can then be provided with an instruction to take his receipt to a customer service kiosk or desk to receive his paid-for lottery tickets and/or to have gift cards activated. For example, FIG. 5E depicts a display screen 500 that instructs the customer to take a gift card to a customer service desk. The display screen may include an explanation field to explain to the customer why he must go to the customer service desk. For example, the display screen 500 includes a parenthetical 504 stating "(activation)". Also as discussed above with FIG. 1, the size and/or weight of certain items may make automated security checks impractical or unfeasible. For example, dog food may be sold in a 50 pound bag. Such a bag may be too heavy for a customer to lift onto a scale. Furthermore, the scale may not be big enough to hold the bag for measurement. As another example, greeting cards and cut flowers may be too light or fragile to be subjected to security checks such as weight verification, described above. FIG. 5D depicts a display screen 500 instructing the customer to leave such items in the shopping cart. Such items may not undergo a security check. Alternatively, in instances in which customers are purchasing such items, an alert may be generated so that an employee can visually verify the purchases of these items.

Figure 3A:
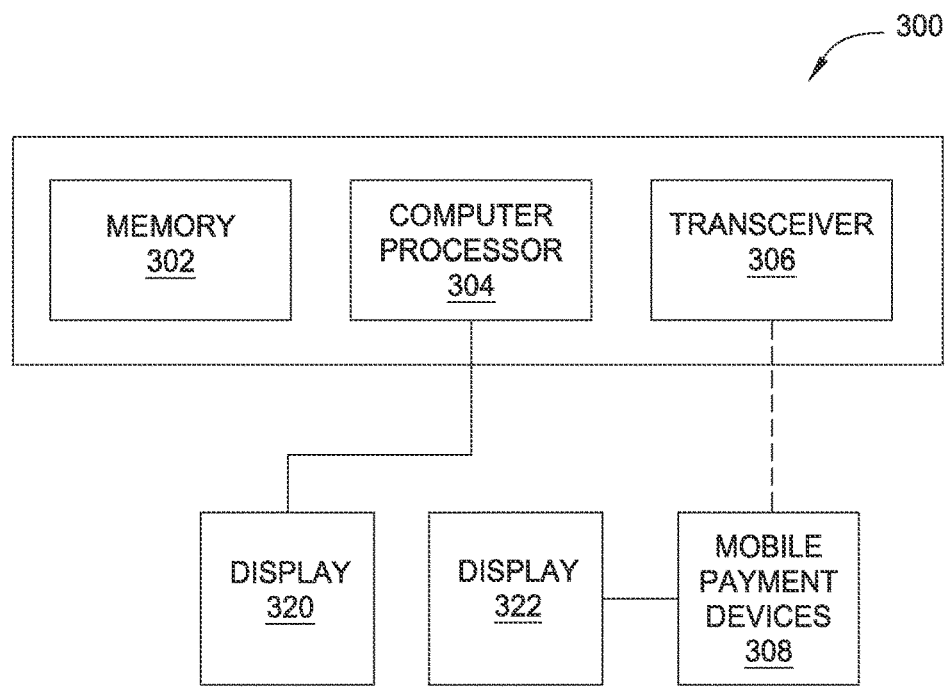
FIG. 3A is a block diagram of an embodiment of a computer system for performing security checks on items in different sub-lists.

Referring now to FIG. 3A, embodiments of a system 300 that can provide a customer with a sub-lists and instructions for arranging items for security checks based on the sub-lists can include memory 302 and a processor 304. The memory 302 can store an executable program that is executable by the computer processor 304 (e.g., to implement the method 200 of FIG. 2A). The memory 302 can also store a lookup table of security check categories for items for sale in the retail store. When a customer adds an item to his shopping list, the processor 304 can access the lookup table to identify a security check category for the item. The system 300 can also include a transceiver 306 that can be in wireless communication (as indicated by dashed line) to mobile payment devices 308, described above. The processor 304 can receive the shopping list from the mobile payment device 308 via the transceiver 306. In various embodiments, the list received from the mobile payment device 308 can be stored in the memory 302. The system 300 can also include a display 320 in various embodiments. As discussed above, in various embodiments, the display 320 can provide the customer with the sub-lists as well as instructions for arranging items in the sub-lists for security checks. In various embodiments, the mobile payment devices 308 can include a display 322 that can provide the customer with the sub-lists as well as instructions for arranging the items in the sub-lists for security checks. The system 300 may control aspects of the display 322 associated with the mobile payment devices 308 via the wireless connection.

Figure 3B:
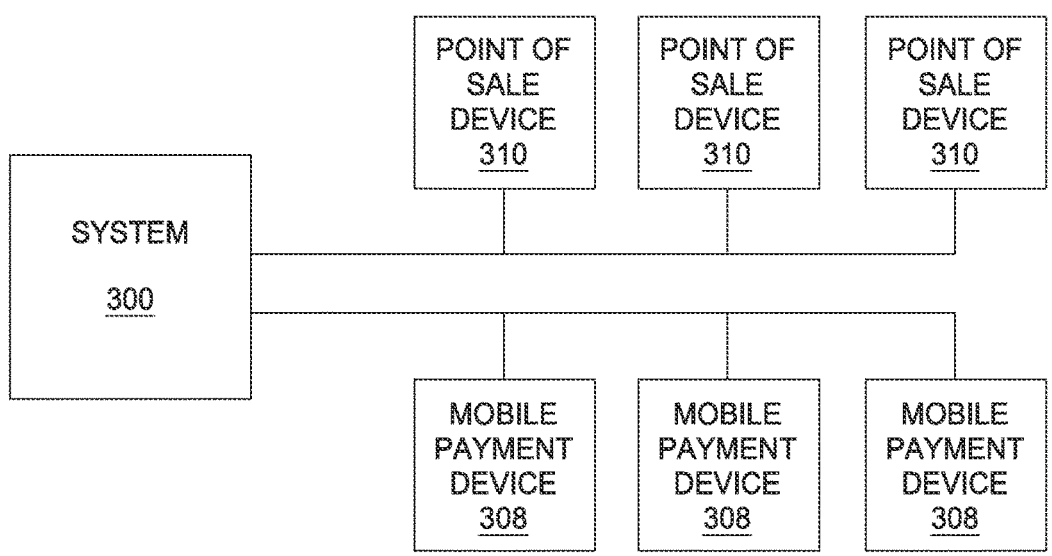
FIG. 3B is a block diagram of an embodiment of a computer system for performing security checks on items in different sub-lists, wherein the computer system in communication with a plurality of point-of-sale devices.

In various embodiments, the system 300 may be incorporated in a point-of-sale device, such as a self checkout kiosk. Referring to FIG. 3B, in various embodiments, the system 300 may be in communication with a plurality of point-of-sale devices 310. For example, the system 300 may be incorporated into a computer server which is in wired or wireless communication with a plurality of point-of-sale devices, such as self checkout kiosks. The server could also be in wireless communication with the mobile payment devices 308.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding paragraphs, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., applications that implement part of all of the process described with respect to FIG. 2A, described above) or related data available in the cloud. For example, a sub-list creation application could execute on a computing system in the cloud and provide to a point-of-sale machine sub-lists of items for purchase and instructions for arranging the items on the sub-lists for security checks. In such a case, the sub-list creation application could receive the customer's list of items for purchase and store the list at a storage location in the cloud. The computing system in the cloud could then operate on the list to associate each item with a security check category, and associate each item with a sub-list. The computing system in the cloud could then return the sub-lists to the customer (via a point-of-sale machine) and instructions for arranging the items in each sub-list for security checks. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method of implementing distinct security check types for distinct categories of items during self-checkout, the method comprising:

receiving a list of items to be purchased as part of a desired transaction at a physical store, each item in the list of items comprising a physical item selected from a plurality of items available for sale;

generating a plurality of sub-lists by operation of one or more computer processors, based on the list of items and based further on a predefined association between each item available for sale with a respective one of a plurality of security check categories, each sub-list pertaining to a distinct one of the plurality of security check categories and containing only those items in the list that are associated with the respective security check category;

generating: (i) a first instruction to present only the items on a first of the plurality of sub-lists for a first security check associated with a first of the plurality of security check categories and (ii) a second instruction to present only the items on a second of the plurality of sub-lists for a second security check associated with a second of the plurality of security check categories, wherein the first and second security checks are of distinct security check types, wherein the items on the first sub-list include one or more items of a first item type and one or more items of a second item type; and outputting the first and second instructions in order to cause the first and second security checks to be performed on the items on the first and second sub-lists, respectively, during self-checkout, wherein the items on the first sub-list are presented on a scale, wherein the first security check comprises a weight verification that includes:

upon determining that a total weight from a single weighing of the items in the first sub-list on the scale exceeds, by at least a threshold difference, an expected total weight determined for the items in the first sub-list, generating and outputting an alert indicating an error detected by the first security check, wherein the desired transaction is not completed until the error is corrected.

2. The method of claim 1, wherein the security check category associated with the second sub-list comprises quantity verification of the items in the second sub-list, wherein the second instruction includes an instruction to sequentially place items from the second sub-list on a point-of-sale device for one of counting and count verification.

3. The method of claim 1, wherein the security check category associated with the second sub-list comprises quantity verification of the items in the second sub-list, wherein the second instruction includes an instruction for a customer of the desired transaction to convey a quantity for each item on the second sub-list for verification.

4. The method of claim 1, wherein the categorized self-checkout is performed with an increased measure of efficiency relative to uncategorized self-checkout, wherein the first and second instructions are output in sequence, wherein the method is performed by an application configured to:

upon determining that the first and second security checks completed without any security check error, complete the desired transaction at the physical store, whereafter an indication of the completed transaction is generated and output;

wherein the first and second instructions to present only the items comprise first and second instructions to physically present only the items, wherein each of the items on the second sub-list is of a respective, distinct item type.

5. The method of claim 4, wherein the security check category associated with the second sub-list comprises quantity verification of the items in the second sub-list, wherein the second instruction includes:

(i) an instruction for a customer of the desired transaction to convey a quantity for each item on the second sub-list for verification; and (ii) an instruction to sequentially place items from the second sub-list on a point-of-sale device for one of counting and count verification.

6. The method of claim 5, wherein the error comprises a first error, wherein the second security check is performed for each sequentially placed item in the second sub-list, wherein performing the second security check comprises:

determining a quantity of the item placed on the point-of-sale device;

comparing the conveyed quantity to the determined quantity; and upon determining a second error comprising the conveyed quantity differing from the determined quantity, generating an alert indicating that the conveyed quantity differs from the determined quantity, whereafter the alert is output in order to notify an attendant of the second error.

7. The method of claim 6, wherein determining the quantity of the item comprises, in a first instance of performing the method:

receiving an image of the item on the point-of-sale device; and automatically counting a number of units in the image.

8. The method of claim 7, wherein determining the quantity of the item comprises, in a second instance of performing the method:

weighing the item on the scale on the point-of-sale device;

retrieving a weight-per-unit metric for the item; and automatically calculating a quantity of the item based on the weight of the item and based further on the retrieved weight-per-unit metric for the item.

9. The method of claim 1, wherein the categorized self-checkout is performed with an increased measure of efficiency relative to uncategorized self-checkout, wherein the first and second instructions are output in sequence, wherein the first and second instructions to present only the items comprise first and second instructions to physically present only the items.

10. A system to implement distinct security check types for distinct categories of items during self-checkout, the system comprising:

a computer memory storing a computer program;

a transceiver configured for communication with a plurality of mobile payment devices; and a computer processor in communication with the computer memory and the transceiver, wherein the computer processor is configured to execute the computer program to:

receive, via the transceiver, a list of items to be purchased as part of a desired transaction at a physical store, each item in the list of items comprising a physical item selected from a plurality of items available for sale;

generate a plurality of sub-lists based on the list of items and based further on a predefined association between each item available for sale with a respective one of a plurality of security check categories, each sub-list pertaining to a distinct one of the plurality of security check categories and containing only those items associated with the respective security check category;

generate: (i) a first instruction to present only the items on a first of the plurality of sub-lists for a first security check associated with a first of the plurality of security check categories and (ii) a second instruction to present only the items on a second of the plurality of sub-lists for a second security check associated with a second of the plurality of security check categories, wherein the first and second security checks are of distinct security check types, wherein the items on the first sub-list include one or more items of a first item type and one or more items of a second item type; and output the first and second instructions in order to cause the first and second security checks to be performed on the items on the first and second sub-lists, respectively, during self-checkout, wherein the items on the first sub-list are presented on a scale, wherein the first security check comprises a weight verification that includes:

upon determining that a total weight from a single weighing of the items in the first sub-list on the scale exceeds, by at least a threshold difference, an expected total weight determined for the items in the first sub-list, generating and outputting an alert indicating an error detected by the first security check, wherein the desired transaction is not completed until the error is corrected.

11. The system of claim 10, wherein the computer memory, transceiver, and computer processor are arranged in a point-of-sale machine, wherein the system further comprises a computer display, wherein the computer processor outputs the first sub-list, the second sub-list, the first instruction, and the second instruction to the computer display.

12. The system of claim 10, wherein the computer processor outputs the first sub-list, the second sub-list, the first instruction, and the second instruction to at least a first of the plurality of mobile payment devices via the transceiver for display on a display screen associated with the first mobile payment device.

13. The system of claim 10, wherein the computer processor further performs the first security check on the items in the first sub-list and the second security check on the items in the second sub-list, wherein the system further includes a selectively illuminating indicator, wherein the computer processor illuminates the indicator upon any error detected by the first security check or the second security check, in order to alert an attendant of the physical store of the error, wherein the attendant comprises an individual other than a customer of the desired transaction.

14. The system of claim 10, wherein the security check category associated with the second sub-list comprises quantity verification of the items in the second sub-list, wherein the second instruction includes an instruction to sequentially place items from the second sub-list on a point-of-sale device for one of counting and count verification.

15. The system of claim 10, wherein the security check category associated with the second sub-list comprises quantity verification of the items in the second sub-list, wherein the second instruction includes an instruction for a customer of the desired transaction to convey a quantity for each item on the second sub-list for verification.

16. The system of claim 10, wherein the categorized self-checkout is performed with an increased measure of efficiency relative to uncategorized self-checkout, wherein the first and second instructions are output in sequence, wherein the first and second instructions to present only the items comprise first and second instructions to physically present only the items.

17. A computer program product to implement distinct security check types for distinct categories of items during self-checkout, the computer program product comprising:
   a computer-readable storage medium having computer-readable program code embodied therewith, the computer-readable program code executable by one or more computer processors to:
      receive, from a mobile payment device, a list of items to be purchased as part of a desired transaction at a physical store, each item in the list of items comprising a physical item selected from a plurality of items available for sale;
      generate a plurality of sub-lists based on the list of items and based further on a predefined association between each item available for sale with a respective one of a plurality of security check categories, each sub-list pertaining to a distinct one of the plurality of security check categories and containing only those items in the list that are associated with the respective security check category;
      generate: (i) a first instruction to present only the items on a first of the plurality of sub-lists for a first security check associated with a first of the plurality of security check categories and (ii) a second instruction to present only the items on a second of the plurality of sub-lists for a second security check associated with a second of the plurality of security check categories, wherein the first and second security checks are of distinct security check types, wherein the items on the first sub-list include one or more items of a first item type and one or more items of a second item type; and
      output the first and second instructions in order to cause the first and second security checks to be performed on the items on the first and second sub-lists, respectively, during self-checkout, wherein the items on the first sub-list are presented on a scale, wherein the first security check comprises a weight verification that includes:
         upon determining that a total weight from a single weighing of the items in the first sub-list on the scale exceeds, by at least a threshold difference, an expected total weight determined for the items in the first sub-list, generating and outputting an alert indicating an error detected by the first security check, wherein the desired transaction is not completed until the error is corrected.

18. The computer program product of claim 17, wherein the security check category associated with the second sub-list comprises quantity verification of the items in the second sub-list, wherein the second instruction includes an instruction to sequentially place items from the second sub-list on a point-of-sale device for one of counting and count verification.

19. The computer program product of claim 17, wherein the security check category associated with the second sub-list comprises quantity verification of the items in the second sub-list, wherein the second instruction includes an instruction for a customer of the desired transaction to convey a quantity for each item on the second sub-list for verification.

20. The computer program product of claim 17, wherein the categorized self-checkout is performed with an increased measure of efficiency relative to uncategorized self-checkout, wherein the first and second instructions are output in sequence, wherein the first and second instructions to present only the items comprise first and second instructions to physically present only the items.

* * * * *